Jan. 3, 1956 A. A. RUNYAN 2,729,497
COLLAPSIBLE CAMPING TRAILER BODY
Filed Feb. 9, 1953 3 Sheets-Sheet 1

INVENTOR.
Arleigh A. Runyan
BY
ATTORNEY.

Jan. 3, 1956 A. A. RUNYAN 2,729,497
COLLAPSIBLE CAMPING TRAILER BODY
Filed Feb. 9, 1953 3 Sheets-Sheet 2

INVENTOR.
Arleigh A. Runyan
BY
ATTORNEY.

Jan. 3, 1956     A. A. RUNYAN     2,729,497
COLLAPSIBLE CAMPING TRAILER BODY

Filed Feb. 9, 1953     3 Sheets-Sheet 3

INVENTOR.
Arleigh A. Runyan
BY
ATTORNEY.

United States Patent Office 2,729,497
Patented Jan. 3, 1956

2,729,497

COLLAPSIBLE CAMPING TRAILER BODY

Arleigh A. Runyan, Gashland, Mo.

Application February 9, 1953, Serial No. 335,788

1 Claim. (Cl. 296—23)

This invention relates to improvements in collapsible camping trailers, the primary object being to provide positively-acting, light weight extending means adapted to raise and lower a roof that is normally in closed relationship to the open top of a primary body portion when the trailer is in tow.

It is the most important object of this invention to provide a trailer of the aforementioned character that includes novel collapsible mechanism of the lazy tong lever type for raising and lowering the roof portion of the trailer as the roof is maintained stable and horizontal throughout its path of travel, said mechanism being housed by the roof and primary body portion when the roof is in a closed position.

It is another important object of this invention to provide adequate sealing means between the roof and the primary body when the roof is lowered, and between walls, which depend from the roof, when the latter is raised, and the main body, all without sacrificing cost, neatness and lightness in the entire body construction.

Another advantageous feature of the retractable trailer forming the subject matter of the present invention lies in the provision of channel structure on the roof which serves as means for sealing the roof and main body, and as a track for parts of the lazy tong scissors links of the extending means above-mentioned.

Other objects of this invention include the way in which the side walls of the trailer, which depend from the roof when the latter is extended to the uppermost end of its path of travel, are easily and automatically folded to an inoperative position beneath the roof as the same is lowered; the way in which access openings are presented for convenience in entering the trailer; the manner of combining a step assembly and an access door in the primary body; the way in which the collapsible mechanisms for raising and lowering the roof are operatively coupled for simultaneous operation; the manner of providing a gear assembly, which may be operably coupled with the collapsible mechanisms for facilitating the manual operation thereof, together with the manner in which the said mechanisms are adapted for electrical or any other power operation; and many additional objects, including arrangements of parts which tend to beautify and streamline the entire assembly, all of which will be made clear as the following specification progresses.

Figures 1, 2, 6:
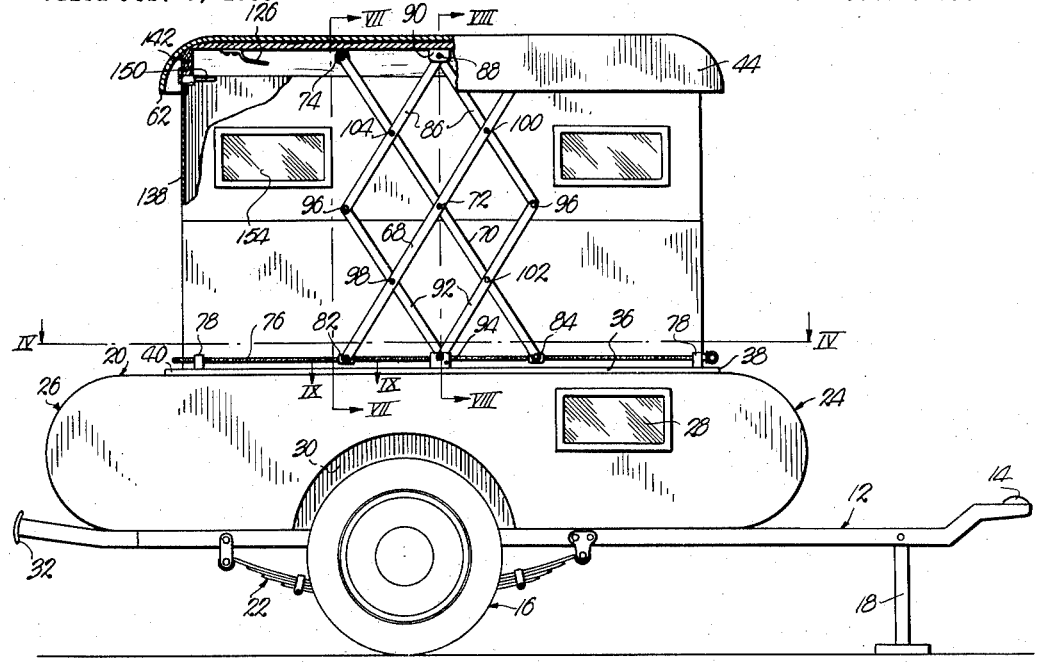
Fig. 1 is a side elevational view of a retractable trailer made pursuant to the present invention, showing the roof thereof in an extended position, parts being broken away and in section for clearance.
Fig. 2 is a side elevational view thereof showing the roof at the lowermost end of its path of travel, parts being broken away for clearance.
Fig. 6 is a fragmentary vertical cross-sectional view through the combined access door and step assembly showing the same in an open condition ready for use in entering the trailer.

As is readily apparent from the drawings, the camping trailer forming the subject matter hereof is of a retractable nature in that the same may be raised to the position shown in Fig. 1 for use, or retracted to the position illustrated by Fig. 2 of the drawing when the trailer is to be placed in tow. A suitable frame broadly designated by the numeral 12 is provided with a hitch 14 on one end thereof in the usual manner, adapting the same for coupling to an automobile or other means of towing the same. The frame 12 and associated parts are supported by a single wheel and axle assembly broadly designated by the numeral 16, and when the trailer is not coupled with a motor vehicle the frame 12 is supported by a retractable pedestal or standard 18.

A primary body broadly designated by the numeral 20 is suitably connected to the frame 12 which is in turn operatively joined to the axle of assembly 16 through spring means 22 in the usual manner.

Figure 3:
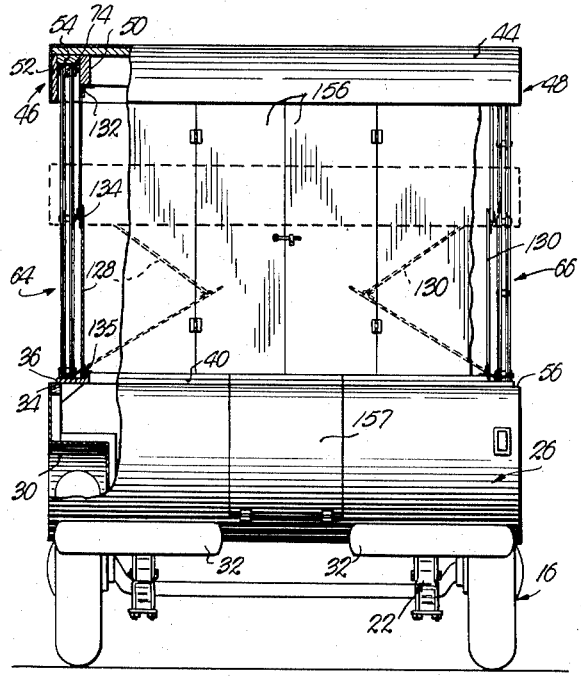
Fig. 3 is a rear elevational view thereof, parts being broken away to reveal details of construction.

The elongated, relatively shallow, hollow body 20 is provided with an arcuate, forwardmost end 24 and a similarly-shaped rearmost end 26, presenting an attractive, streamlined appearance and, if desired, the body 20 may be provided with windows 28 in the sides thereof as shown in Figs. 1 and 2 of the drawings. It is additionally desirable to provide wells 30 for clearing the wheels of the assembly 16, and the rearmost end of the frame 12 has a pair of bumpers 32 that are spaced apart as shown in Fig. 3 of the drawings for purposes to be hereinafter made clear.

Figure 5:
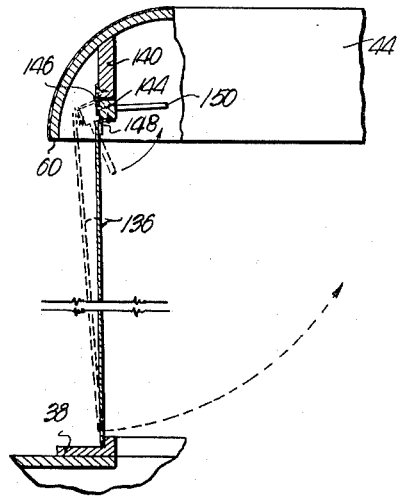
Fig. 5 is a fragmentary view, partly in section, through the front, swingable wall of the trailer, illustrating its manner of swinging to and from an operative position.
Figure 7:
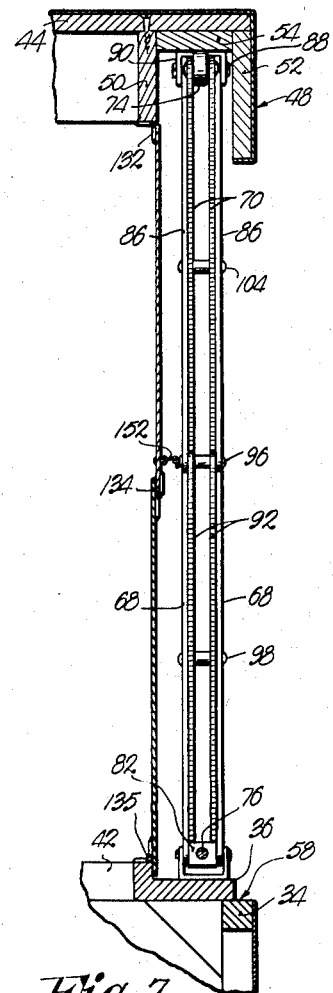
Fig. 7 is an enlarged, cross-sectional view taken on line VII—VII of Fig. 1.
Figure 8:
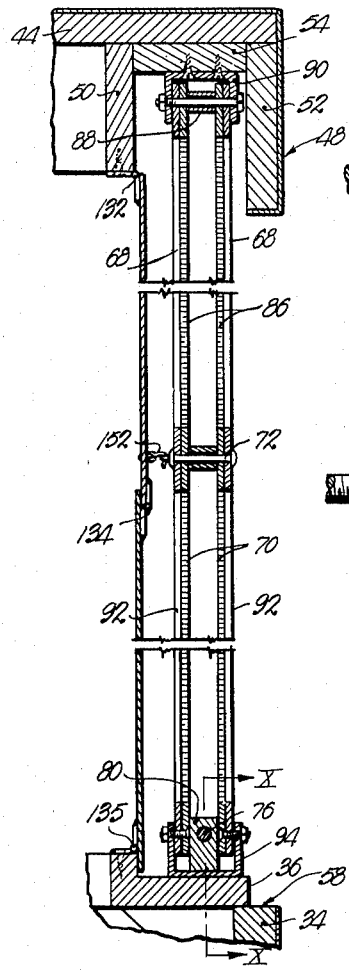
Fig. 8 is an enlarged, cross-sectional view taken on line VIII—VIII of Fig. 1.

The primary body 20 is provided with a pair of uppermost elongated side beams 34 that in turn support plates 36 that are L-shaped in cross section in the manner illustrated by Figs. 7 and 8 of the drawings. Similarly-shaped plates 38 and 40 are provided for the forwardmost and rearmost ends of the body 20 as shown in Figs. 5 and 6 respectively. The four plates 36—36, 38 and 40 cooperate in presenting a polygonal opening in the top of the body 20 having the shape shown in Fig. 4 of the drawings and designated by the numeral 42.

A closure for the opening 42 of body 20 takes the form of a roof 44 that is likewise streamlined and having the shape of an inverted, shallow pan. Roof 44 is provided with a pair of side channel members broadly designated by the numerals 46 and 48 respectively. Open bottom channel members 46 and 48, depending from the roof 44, are substantially U-shaped in cross-section as seen in Figs. 3, 7, and 8, presenting a pair of elongated, vertical legs 50 and 52 and a horizontal bight portion 54. It is to be noted that plates 36 are slightly offset relative to the beams 34 and that the legs 52 are slightly longer than the legs 50. Accordingly, when the roof 44 is at the lowermost end of its path of travel, resting upon the primary body 20, as shown in Fig. 2 of drawing, the two legs 52 will rest directly upon the uppermost edges 58 of the beams 34 in over-lapping relationship to the plates 36. Such lap joints present an effective seal when roof 44 is in the closed position. Forwardmost edge 60 and rearwardmost edge 62 of the roof 44 cooperate similarly with the plates 36 as is seen in Figs. 1 and 5.

Extending means for raising and lowering the roof 44 takes the form of a pair of identical, collapsible mechanisms of the lazy tong lever type broadly designated by the numerals 64 and 66 respectively. The double linkage of each of these two mechanisms 64 and 66 is separated by spacers throughout at all points of crossing and pivotal connection in the manner illustrated most clearly by Figs. 7 and 8 of the drawings.

Figure 9:
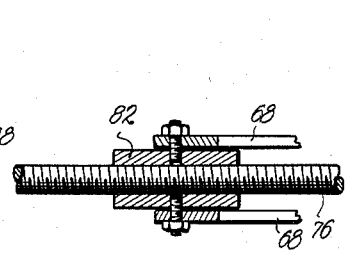
Fig. 9 is an enlarged, detailed, cross-sectional view taken on line IX—IX of Fig. 1.
Figure 10:
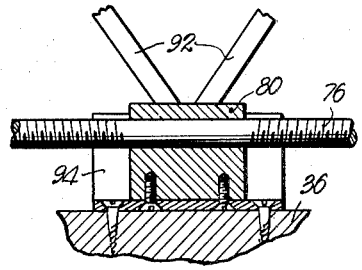
Fig. 10 is an enlarged, fragmentary, detailed cross-sectional view taken on line X—X of Fig. 8; and, Fig. 11 is a plan view of a gear shifting mechanism that may be operably connected with the rotatable screw shafts to facilitate raising of the roof.

Each mechanism 64 and 66 includes a pair of crossed scissors links 68 and 70 pivotally interconnected at the point of crossing by a pin 72. The uppermost ends of the links 68 and 70 are provided with rollers 74 that are in bearing engagement with the lowermost face of the corresponding bight member 54, the latter thereby serving as tracks for the rollers 74. Each mechanism is additionally provided with an elongated screw shaft 76 that is rotatably carried by a pair of spaced bearings 78 mounted on the corresponding plate 36. Screw shaft 76 is additionally supported midway between the ends thereof by a center bearing 80 as shown in Fig. 10 of the drawings, and it is to be noted that the shaft 76 is devoid of threads within the bearing 80. Bearing 80 is disposed between a pair of spaced trunnion blocks 82 and 84 for the links 68 and 70 respectively, which links 68 and 70 are in turn pivotally connected to the trunnions 82 and 84 in the manner illustrated by Fig. 9 of the drawings.

Additional linkage of the lazy tong lever type is provided to pivotally interconnect the roof 44 with the primary body 20. Such linkage consists of a pair of uppermost links 86 that are pivotally interconnected at their uppermost ends by means of a pivot pin 88 carried by a bracket 90 that is in turn secured to the lowermost face of the corresponding bight 54 within the channel 48. A pair of lowermost links 92 are pivotally interconnected and joined to a bracket 94 secured to the corresponding plate 36 and serving additionally as a means of mounting the centermost bearing 80 in the manner shown by Fig. 10 of the drawings. The two uppermost links 86 are pivotally connected to corresponding lowermost links at 92 by pivot pins. It is noted that the scissors link 68 crosses one of the lowermost links 92 and one of the uppermost links 86 to which it is pivotally joined as at 98 and 100. Similarly the scissors link 70 crosses one of the lowermost links 92 and one of the uppermost links 86 to which it is pivotally joined by pins 102 and 104 respectively.

Figure 4:
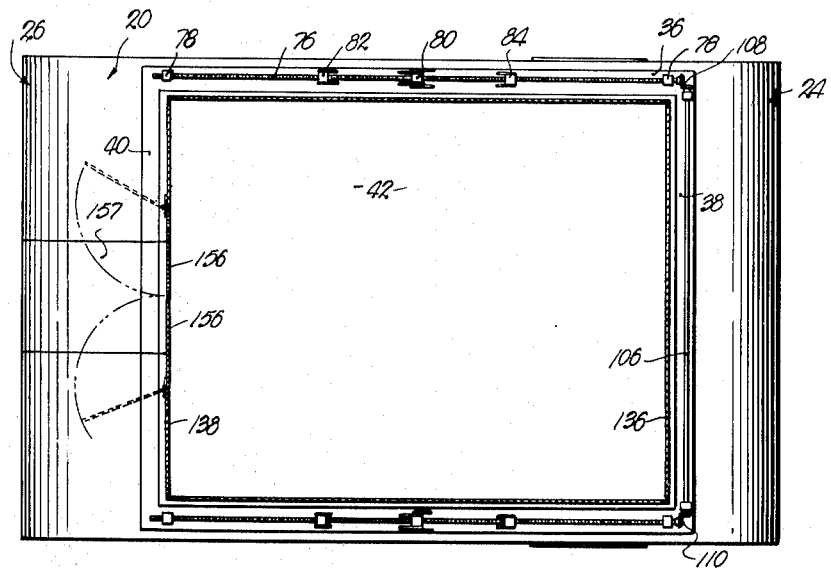
Fig. 4 is a horizontal cross-sectional view tken on line IV—IV of Fig. 1.

The two mechanisms 64 and 66 are operably interconnected in the manner shown by Fig. 4 of the drawing to the end that but one of the shafts 76 needs to be rotated in order to collapse or extend the two mechanisms and thereby move the roof 44 to either of its two extreme positions. To this end a connecting shaft 106 rotatably carried by the forwardmost plate 38 is operably joined to the two shafts 76 by two pairs of intermeshing pinions 108 and 110 respectively.

Figure 11:
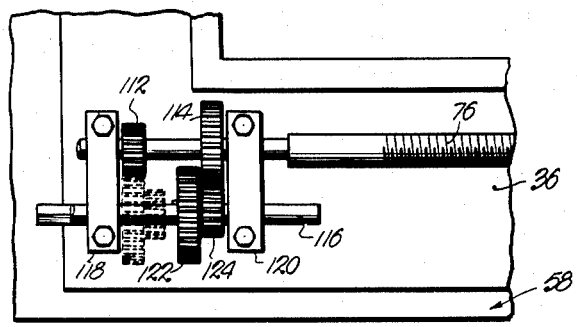

Increased leverage for facilitating the raising and lowering of the roof 44 may be provided through use of a gear reduction unit, such as illustrated in Fig. 11 of the drawing. One of the shafts 76 is provided with a smaller gear 112 and a larger gear 114 spaced therefrom. A short countershaft 116 is reciprocable on its longitudinal axis within bearings 118 and 120 for the shaft 116 and the adjacent shaft 76. Countershaft 116 is likewise provided with a large gear 122 and a smaller gear 124 adjacent thereto. A suitable manually operable crank (not shown) may be provided to rotate the countershaft 116. During initial raising of the roof 44 the gear 124 may be moved into mesh with the gear 114, as shown in full lines of Fig. 11 and the raising operation will be relatively easy.

During continued raising of the roof 44 the shaft 116 may be shifted within the bearings 118 and 120 to move the gear 122 into mesh with the gear 112. In the same manner, the roof 44 may be lowered rapidly and easily until it nears the body 24, whereupon gear 124 may be again shifted into mesh with gear 114 to force the roof 44 down tightly against body 24. It is to be appreciated at this point that in lieu of providing a manually manipulable crank for the shaft 116 suitable electrically operated or any other power applying mechanism may be connected with the shaft 116 to raise and lower the roof 44. Thus an electric motor or the like operably connected with the shaft 116 may have controls that automatically de-energize the motor as the roof 44 arrives at the uppermost or lowermost ends of its path of travel.

It is to be noted that when the roof 44 is lowered to the position shown in Fig. 2 of the drawing the rollers 74 each slip into a corresponding spring clip 126 secured to the corresponding bight 54. Additionally, when the roof 44 is lowered, the two channel members 48 serve as a housing for the two corresponding mechanisms 64 and 66.

In addition to the secondary function of the channel members 48 in sealing the roof 44 and the body 20, as above described, the channel members 48 have a third function, namely, that of supporting side walls 128 and 130 respectively. When the roof 44 is elevated the side walls 128 and 130 depend from corresponding legs 50, as shown in Figs. 7 and 8 of the drawing. The foldable walls 128 and 130 are rendered swingable relative to the legs 50 by hinge means 132 operably interconnecting the walls 128 and 130 with their legs 50. The two relatively overlapped, panel-like walls 128 and 130 are composed of a pair of sections joined by a hinge 134 adjacent their point of relative overlapping.

The side walls 128 and 130 extend from the elevated roof 44 to the body 20 and present a lap joint by a cooperative overlapped engagement with the L-shaped plates 36, as illustrated in Figs. 7 and 8 of the drawings. Hinge means 135 joins the lower section of walls 128 and 130 to plates 36. By virtue of the provision of hinges 132, 134 and 135, the two articulated sections of the walls 128 and 130 fold automatically to a position underlying the roof 44 when the latter is lowered in the manner illustrated by dotted lines in Fig. 3 of the drawings.

A front, panel-like wall 136 and a rear wall 138 are also provided to present a complete enclosure above the open top 42 of the bottom 20 when the roof is raised to the position shown in Fig. 1 of the drawings. Flanges 140 and 142 are provided on the roof 44 for mounting the walls 136 and 138 respectively.

A novel arrangement is provided for the two walls 136 and 138 to permit swinging the same from the lapped and locked-closed relationship with the corresponding plates 38 and 40, as shown in full lines by Fig. 5 of the drawing. By way of example only and to illustrate one possible embodiment of this phase of my invention, each of the flanges 140 and 142 is provided with an elongated strip 144 extending the entire length thereof therebelow and swingably connected thereto by means of a hinge 146. The walls 136 and 138 are in turn swingably secured to the corresponding strips 144 by hinge means 148.

Through use of a handle 150 rigidly secured to the strips 144 the latter may be swung from the full line position shown in Fig. 5 of the drawing to the dotted line position, which causes the corresponding wall 136 and 138 to first move out of engagement with the corresponding plate 38 or 40, as the case may be. Thereupon the strip 144 is returned to the full line position of Fig. 5 and the panel 136 or 138, as the case may be, is swung to a position beneath the roof 44 and if desired attached thereto by fastening means not shown.

A hook fastener 152, as shown in Figs. 7 and 8 of the drawings, is provided to join the walls 128 and 130 with the mechanisms 64 and 66, when these walls are in an operating position depending from the roof 44.

Excellent rigidity is afforded when the roof 44 is extended by virtue of the side walls 128 and 130 being tied to the mechanisms 64 and 66 through fasteners 152 and by walls 136 and 138 being wedged in tightly between roof 44 and plates 38 and 40. Suitable windows 154 may be provided in the side walls and 130, as shown in Fig. 1 of the drawings.

The rear wall 138 is provided with a pair of swingable access doors 156 and a combined access door and step assembly 157 is provided in the primary body 20 at the rearmost end 26 thereof in alignment with the doors 156. The arcuate door 157 is shown in the open position in Fig. 6 of the drawing supported by a suitable pedestal 158, the spaced apart bumpers 32 permitting such swinging movement of the door 157 to and from the closed position. A plurality of steps 160 secured to the door 157 are housed within the body 20 when the door 157 is closed.

The trailer and particularly the body 20 thereof may be internally furnished as desired, but it is now apparent that body 20 is adapted to receive a bed and other light-housekeeping equipment, which need not be collapsed or moved when the roof 44 is lowered. By the same token, when the roof 44 is extended and the side walls 128 and 130, as well as the end to walls 136 and 138 lowered, the occupants of the trailer may stand therewithin without stooping.

The body 20 and the roof 44 are shown in the drawings provided with a metallic covering throughout and such construction may likewise be varied according to the desires of the manufacturer. It is manifest further that when desirable, suitable screen or other foraminous material mounted on rollers may be utilized in lieu of the imperforate side and end panels herein described. Such rollers may be suitably mounted on the roof 44 and particularly on the innermost legs 50, as desired.

Still another advantageous feature that may be provided, and which has not been illustrated in the drawings, lies in the provision of sheet metal guards for the shafts 76 and associated parts, which may be secured to the body 20 in partial overlying relationship to these parts and yet clear the roof 44 when the latter is lowered.

These and many other advantageous features may be included in the improved camping trailer hereof without departing from the spirit of the invention, and it is therefore desired to be limited only by the scope of the appended claim.

Having thus described the invention, what is claimed as new and desired to be secured by Letters Patent is:

In a trailer, an open top, hollow body; a hollow, open-bottomed roof for the open top of said body; a pair of spaced extending means underlying the roof, each including a collapsible mechanism of the lazy tong lever type having a pair of crossed, scissors links pivoted together intermediate their ends, spaced trunnion blocks in substantial axial alignment, said links having lowermost ends pivotally connected to said blocks in spaced relation, and an operating screw shaft rotatably carried by said body and threaded in said spaced blocks for raising and lowering said roof relative to the body and for maintaining stability of the roof in any position throughout its path of travel; an elongated, downwardly opening channel member on the roof for each of said extending means respectively and aligned therewith when the roof is at the lowermost end of its path of travel covering the open top of the body and said mechanisms are collapsed, each channel member being substantially U-shaped in transverse cross-section, presenting a horizontal bight and a pair of spaced, vertical legs, the upper ends of said links being within corresponding channel members and having anti-friction elements in bearing engagement with the bight thereof, there being a lap joint between one leg of each member and the body when the roof is at said lowermost end of its path of travel; an articulated wall hingedly secured at its upper extremity to the other leg of each channel member respectively, said walls depending from their channel members and extending to said body when the roof is at the uppermost end of its path of travel, each wall including a pair of hingedly interconnected sections rendering the same foldable to a position underlying the roof when the latter is lowered in covering relationship to the open top of the body, there being a lap joint between each wall and the body when the walls are depending from the channel members the sections of each wall being overlapped along their line of hinged interconnection when the roof is at the uppermost end of its path of travel, each of said walls having its lowermost section hingedly secured to the body; and a second pair of articulated wall assemblies each having an upper section hingedly secured at its uppermost extremity to the roof for outward swinging movement away from the center of the roof and a lower section hingedly interconnected with the corresponding upper section for free inward swinging movement toward the center of the roof, the lowermost extremities of the last-mentioned lower sections being adapted to engage the body when the roof is at the uppermost end of its path of travel, said last-mentioned upper sections being disposed within the roof and having their lowermost extremities above the lowermost extremity of the roof.

References Cited in the file of this patent

UNITED STATES PATENTS

| | | |
|---|---|---|
| 722,166 | Taft | Mar. 3, 1903 |
| 1,632,270 | Bradley et al. | June 14, 1927 |
| 2,483,332 | Brumbaugh | Sept. 27, 1949 |
| 2,554,494 | Hodgin | May 29, 1951 |
| 2,561,921 | Guillot | July 24, 1951 |

FOREIGN PATENTS

| | | |
|---|---|---|
| 573,470 | Germany | Apr. 1, 1933 |
| 311,089 | Great Britain | May 9, 1929 |
| 484,501 | Great Britain | May 6, 1938 |